United States Patent [19]
German et al.

[11] Patent Number: 5,193,874
[45] Date of Patent: Mar. 16, 1993

[54] T-TOP INSERT STORAGE RACK WITH LOCKING MECHANISM

[75] Inventors: Laurence J. German, Huntington Woods; Lawrence D. Rich, New Baltimore, both of Mich.

[73] Assignee: LTC Roll & Engineering Company, Mt. Clemens, Mich.

[21] Appl. No.: 755,562

[22] Filed: Sep. 5, 1991

[51] Int. Cl.⁵ .............................................. B60R 11/00
[52] U.S. Cl. .................................... 296/37.1; 296/218; 224/42.42; 224/42.45 R; 224/311; 206/454
[58] Field of Search ................. 296/37.1, 218; 211/41; 224/42.42, 42.45 R, 311; 206/454

[56] References Cited

U.S. PATENT DOCUMENTS

| | | | |
|---|---|---|---|
| 2,946,453 | 7/1960 | Pityo | 211/41 |
| 3,635,518 | 1/1972 | Eger | 296/218 X |
| 4,033,597 | 7/1977 | Boyer | 211/41 X |
| 4,093,251 | 6/1978 | Boyer | 211/41 X |
| 4,202,452 | 5/1980 | McCormick | 211/41 |
| 4,467,944 | 8/1984 | Manko et al. | 296/218 X |
| 4,542,931 | 9/1985 | Walker, Jr. | 296/100 |
| 4,718,710 | 1/1988 | Iwamura et al. | 296/37.1 |
| 4,778,064 | 10/1988 | Gold | 211/41 |
| 4,889,891 | 2/1990 | Sipila et al. | 211/41 |
| 4,921,101 | 5/1990 | Gatt | 206/454 X |

*Primary Examiner*—Dennis H. Pedder
*Attorney, Agent, or Firm*—Dykema Gossett

[57] ABSTRACT

A storage system for motor vehicle roof inserts has two matched body portions which are mounted in a motor vehicle. Each body portion includes a pair of channels which are shaped to conform to the shape of the roof inserts. The storage bodies are spaced a distance which corresponds to the length of the roof inserts such that the edge portions of the inserts can be inserted into the channels where they are supported spanning the space between the storage bodies. Resilient opposed rollers in association with each channel guide and support the roof inserts in the channels. The storage bodies may include pin-receiving bores positioned to receive retractable roof insert posts to secure the roof inserts in position in the storage system. The storage bodies may be conveniently formed by an injection molding process using ABS plastic.

19 Claims, 4 Drawing Sheets

T-TOP INSERT STORAGE RACK WITH LOCKING MECHANISM

TECHNICAL FIELD

The present invention relates generally to a storage system for motor vehicle t-top insert and, more specifically, provides a two-piece storage rack in which automobile roof inserts can be conveniently stored in a locked position.

BACKGROUND OF THE INVENTION

A number of automobiles are now equipped with a roof structure having removable inserts. These inserts may stand alone or be laterally disposed on each side of a central bar that extends generally from the front windshield to a rear roof portion. The roof bar is in alignment with the longitudinal axis of the automobile such that the roof inserts are positioned bilaterally with respect to the central roof bar. These arrangements are typically referred to as "t-top roofs" and they have become a popular feature of many automobiles, particularly sports models.

Motor vehicle roof inserts are locked into position in the roof by locking means which typically includes a pair of retractable rods or pins that are received by closing fitting bores in the roof structure. These pins may be retraced to move the inserts from the roof structure at those times during which the vehicle occupant desires to convert the vehicle to the open-air mode of operation. Thus, this configuration allows drivers to enjoy many attributes of convertible top vehicles in a manner quite distinct from conventional roll-back convertible top automobiles.

As will be appreciated by those skilled in the art, however, a number of problems which have not yet been solved in the industry are associated with the storage of motor vehicle roof inserts. More specifically, since the roof inserts are visible when installed, their aesthetic appearance is important to the overall appearance of the motor vehicle. Therefore, great care must be taken during the removal and storage of the inserts to ensure that they are not marred or otherwise disfigured. In addition, due to unpredictable changes in weather conditions, it is necessary to transport the inserts in the motor vehicle so that they may be reinstalled in the event of sudden adverse conditions such as rain or snow. This need for immediate access to the inserts dictates that a practical storage apparatus must not only be conveniently located in the motor vehicle, but must also enable the driver to quickly remove the inserts from the storage device.

In addition, it is known that on occasion the left of roof inserts from a motor vehicle occurs. In order to deter theft of the inserts from their installed position in the roof, most roof inserts are now provided with key-actuated locks by which a key is needed in order to retract the aforementioned pins when they are locked, thereby allowing removal of the roof inserts. Since it is also known that the unauthorized removal of article within motor vehicles often occurs, it would be desirable to provide a roof insert storage device that would accommodate the key lock feature of most inserts such that the inserts could be locked into the storage device as a theft deterrent measure.

In addition, as is well known by original equipment manufacturers, a significant goal in motor vehicle manufacture is the minimization of total vehicle weight. Therefore, it would be desirable to provide a roof insert storage device which is extremely lightweight. It would also be desirable to provide such a storage device in a manner in which the body of the storage device could be manufactured by injection molding or the like. The present invention provides a storage device for roof inserts which achieves all of these desirable goals.

SUMMARY OF THE INVENTION

In accordance with the present invention, in one aspect there is provided a storage apparatus for the storage of motor vehicle roof inserts which includes a first roof insert-receiving body having two channels that are contoured to generally mate with the contour of the roof inserts to be stored and a matching second roof insert-receiving body having two channels that are contoured to generally mate with the opposite edge portions of the roof inserts. The two storage bodies are mounted in a well area of a motor vehicle and are spaced apart a predetermined distance which corresponds to the dimensions of the roof inserts. The roof inserts are independently inserted into the storage apparatus by sliding the inserts into the channels.

In another embodiment, each storage body includes means for securing the roof inserts into the channels. In this embodiment, each storage body includes a pair of bores, one of each bores being associated with one of the insert-receiving channels. Each bore is positioned such that upon insertion of the roof inserts into the channels retractable locking pins located at the edges of the inserts can be extended to project into the bores to engage the storage bodies, thereby securing the inserts in place. Where the roof inserts include a lock means, the extended pins may be locked into this position to safeguard against theft of the inserts.

In another embodiment, the storage apparatus of the present invention comprises a pair of matched storage bodies with each body being formed as an injection-molded structure. Complementary insert-receiving channels are formed in the bodies during the molding process. Each channel has an open top portion and a closed portion, the latter of which terminates in the storage body. Each channel preferably includes a region of material which provides a soft, resilient surface to support the roof inserts in a manner that prevents scratching or abrasion of the inserts by the storage apparatus. The bodies are preferably formed as hollow structures, i.e. as shells having the foregoing features and attributes, in order to reduce weight. Again, each body includes a pair of pin-receiving bores which mate with the roof insert pins or posts to secure the inserts in position in the storage apparatus. In some instances, these bores may be fitted with grommets. The storage bodies further include means for bolting the bodies to the side walls of a motor vehicle well. The geometry of the storage bodies and/or the channels in one embodiment is such that the inserts are stored in the apparatus of the present invention in a manner which complements the contour of hatchback roofs.

In another embodiment, a plurality of resilient rollers are provided which guide the roof inserts into the channels. Accordingly, two opposed rollers are provided in association with each channel at the channel opening. Resilient roller coverings or padding yields to frictionally receive and support the inserts as they are inserted into the channels and they remain in contact with the inserts to ensure that they are supported in a manner which dampens vibration and prevents surface scratches and the like.

In still another embodiment, the present invention provides a method of storing roof inserts which includes the steps of retracting the pins of a first roof insert from the motor vehicle roof; inserting the first roof insert into a first set of complementary channels of a matched pair of motor vehicle roof insert storage structures mounted in a motor vehicle; the roof insert storage structures each having a bore for receiving the pins of the first roof insert; extending the retracted pins such that a portion of the pins extend into the bore to secure the first roof insert into position in the storage structures; retracting the pins of a second roof insert and removing the roof insert from the motor vehicle roof; inserting the second roof insert in a second set of complementary channels of the matched pair of roof insert storage structures; and extending the retracted pins such that a portion of the pins extend into the bores to secure the second roof insert into position in the storage structures.

Finally, the present invention provides a motor vehicle having a storage system for receiving and securing motor roof inserts.

These and other advantages and meritorious features of the present invention will now be described in connection with the following description of the preferred embodiments of the invention with reference to the drawings, in which:

DESCRIPTION OF THE PREFERRED EMBODIMENTS OF THE INVENTION

Figure 1:
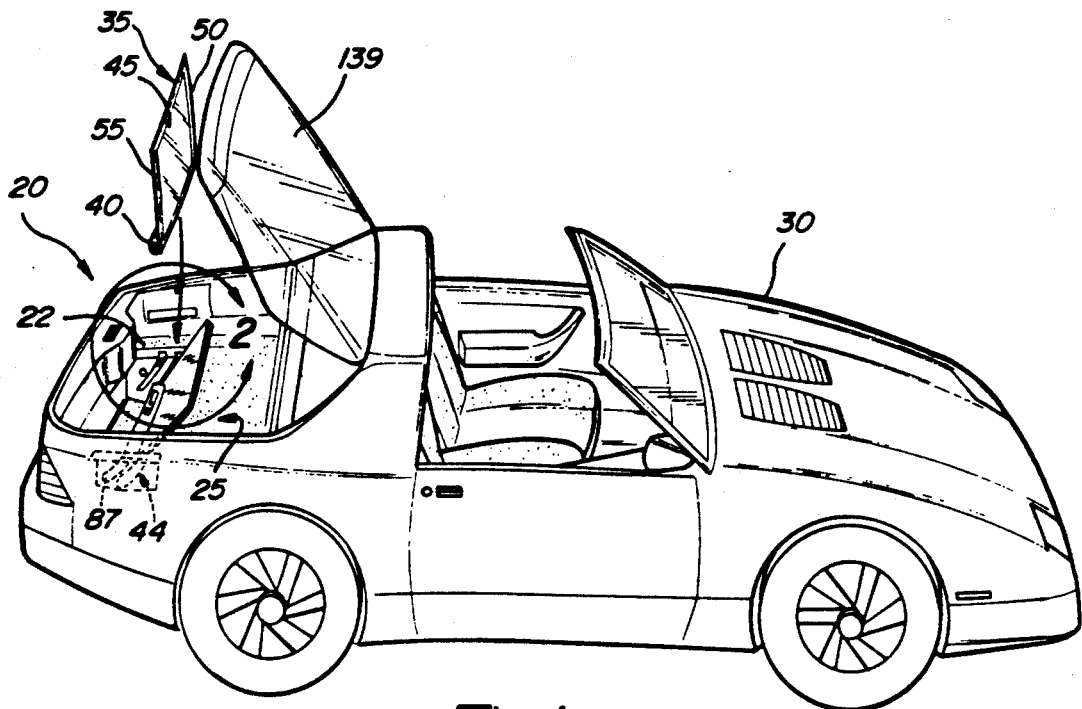
FIG. 1 is a perspective view of a motor vehicle having a t-top roof; the storage bodies of the present invention are mounted in a rear compartment of the vehicle. A roof insert is shown in a first position ready to be received in the storage channels and in a second position mounted in the storage system of the present invention.

Referring now to FIG. 1 of the drawings, motor vehicle roof insert storage system or assembly 20 is shown generally having a first storage body 22 and a complementary second storage body 44, the latter shown in phantom, both storage bodies 22 and 44 are mounted in well 25 of motor vehicle 30. The motor vehicle roof insert to be stored in shown here as roof insert 35 having post and lock assembly 40 mounted to the underside of panel portion 45. It will be appreciated by those skilled in the art that there are numerous configurations of the present invention and that only one typical configuration is shown in the drawings. Accordingly, the present invention is directed to the storage of various roof inserts, the geometries of which may be accommodated by the present invention so long as the principles set forth herein are faithfully observed. In this particular embodiment, panel portion 45 is curved outwardly of the interior surface upon which post and lock assembly 40 is mounted. As will be explained more fully herein, this curvature is taken into consideration in the design of first and second storage bodies 22 and 44.

Each panel portion 45 of roof insert 35 has a region or portion referred to herein as lateral edge portion 50 and a corresponding lateral edge portion 55 at the other side of panel portion 45. It is these lateral edge portions 50 and 55 which actually engage first and second storage bodies 22 and 44 as will be described hereinafter. A second roof insert 37 is shown in FIGS. 3 and 4.

Figure 2:
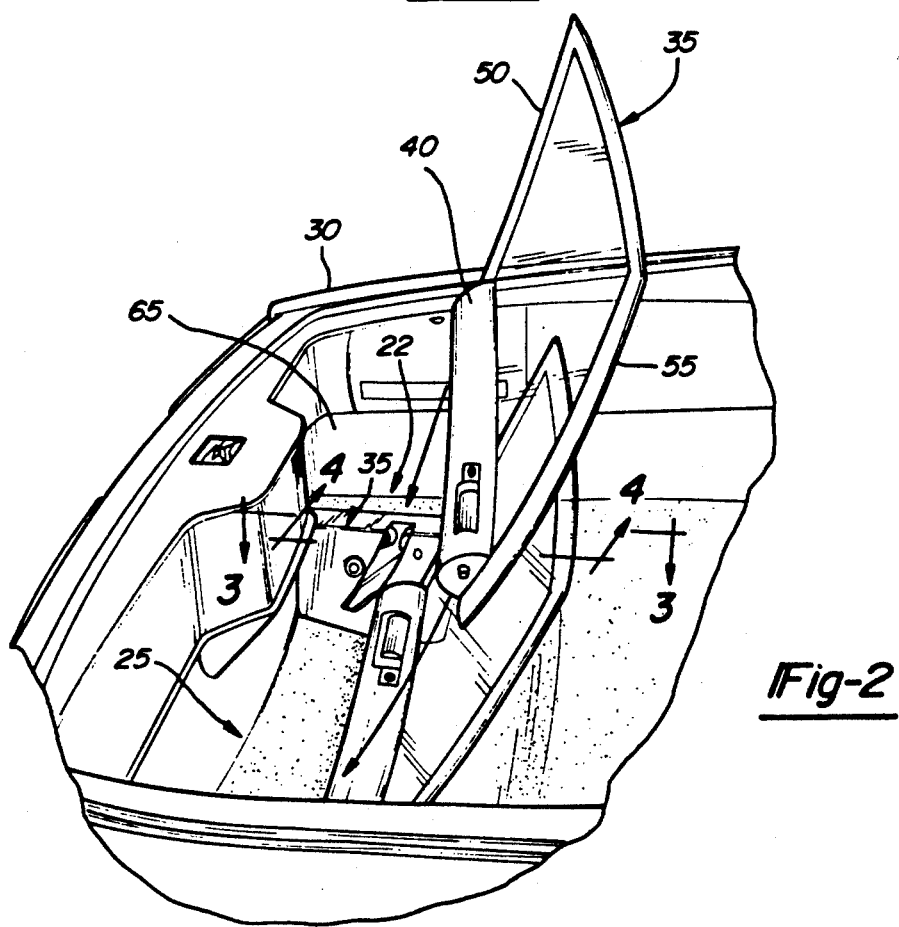
FIG. 2 is a perspective view of the area within the region generally indicated by arrow 2 of FIG. 1; one storage body of the present invention is shown mounted in a vehicle compartment.
Figure 5:
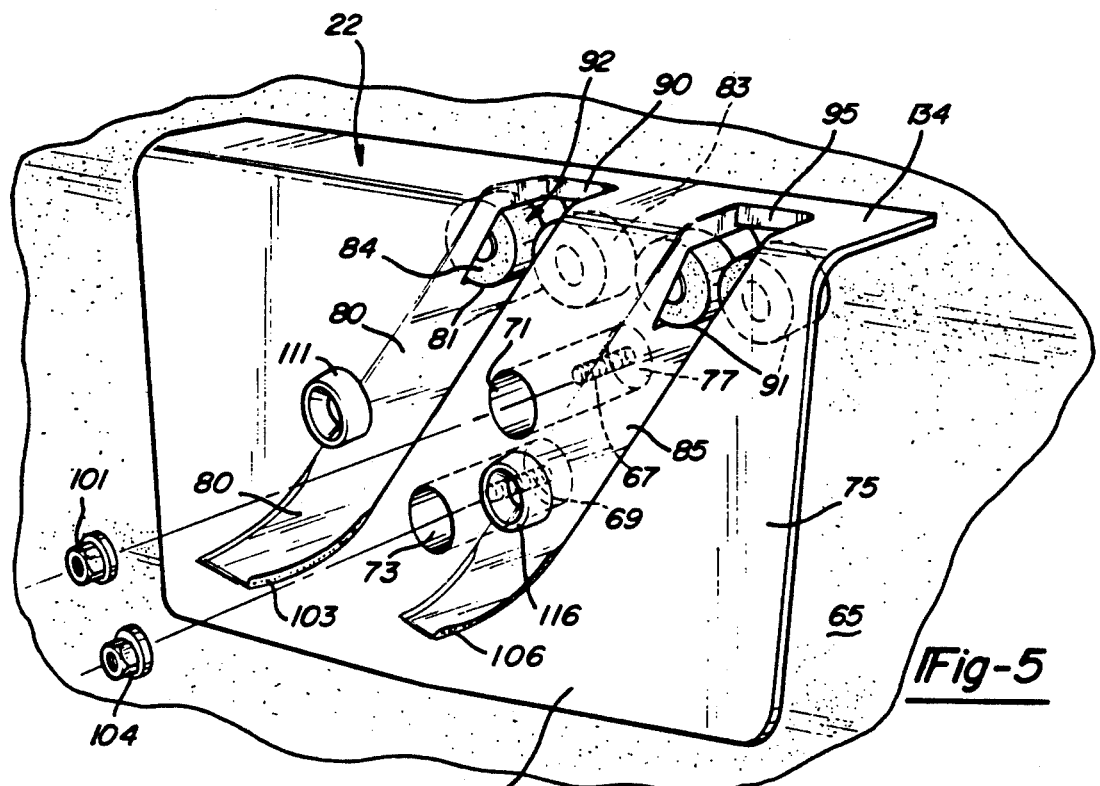
FIG. 5 is a perspective view of the storage body of FIG. 3, in which the placement of mounting studs is shown.

As best shown in FIGS. 2 and 5, first storage body 22 is shown attached to side wall 65 of well 25 of motor vehicle 30. The means by which the storage bodies are attached is not critical; however, referring to FIG. 5, in one embodiment, attachment to side wall 65 is made by bolts or studs 67 and 69 which extend from hat-shaped plate 77 (in phantom) that is spot-welded to side wall 65 through cylindrical recesses 71 and 73 of storage body 22 which are also shown in phantom. Nuts 101 and 104 are then secured onto studs 67 and 69 and are tightened down into recesses 71 and 73.

Figure 3:
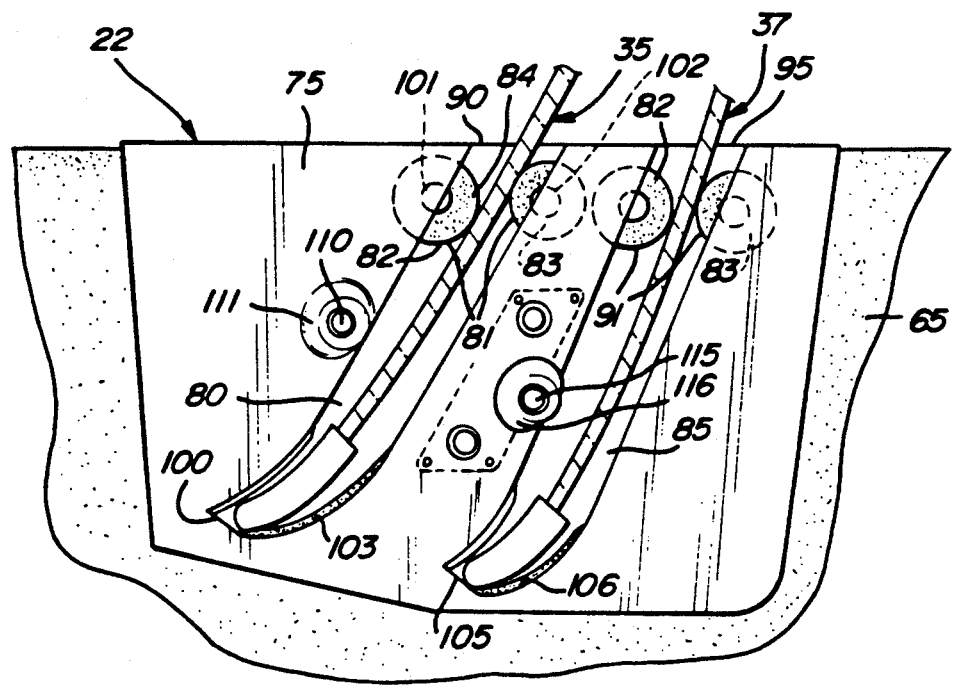
FIG. 3 is a side elevational view of the storage body of FIG. 2.

Referring now to FIG. 3 of the drawings, storage body 22 includes a body portion 75 in which a first channel 80 and a second channel 85 are disposed. Channels 80 and 85 each have, respectively, open ends 90 and 95 and closed ends 100 and 105.

Figure 4:
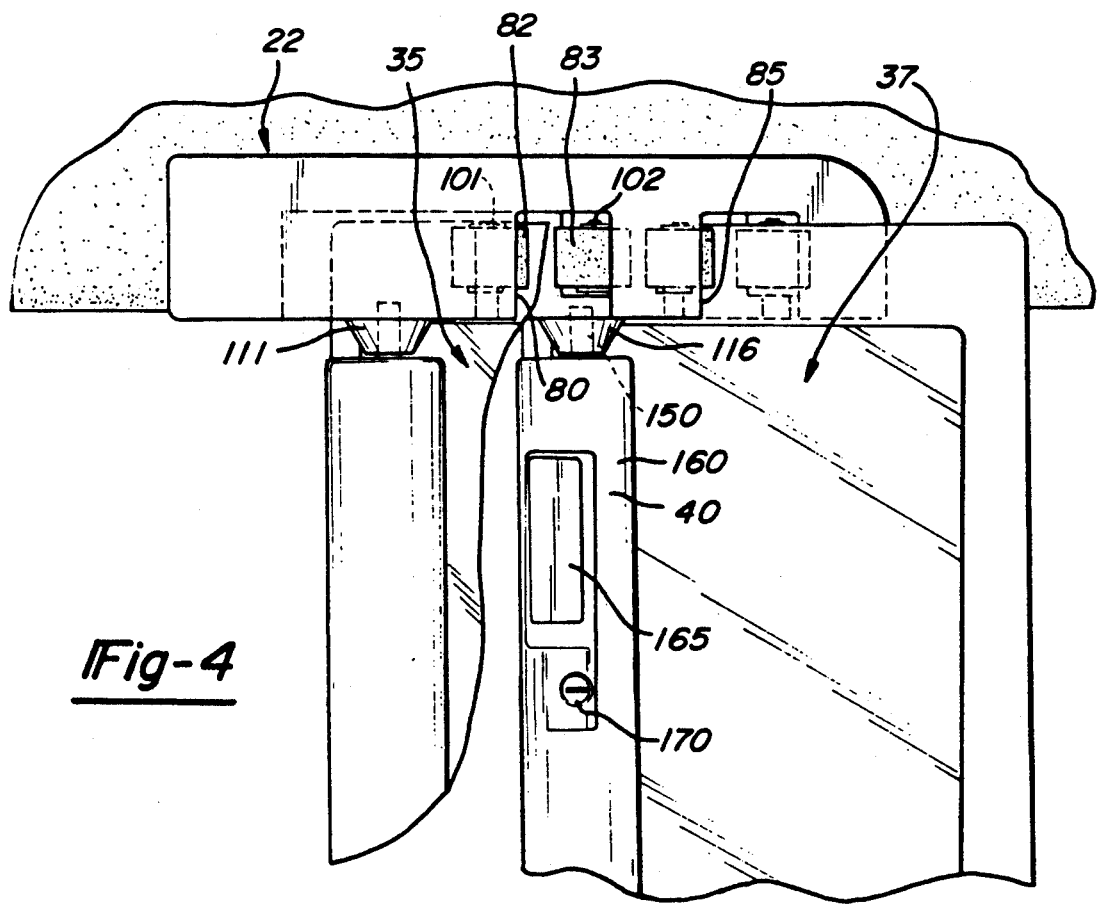
FIG. 4 is a top view of the storage body depicted in FIG. 3.

As best shown in FIGS. 3-5, in order to guide roof inserts 35 and 37 into channels 80 and 85, a first pair of opposed rollers 81 and a second pair of opposed rollers 91 are provided in association with channels 80 and 85, respectively. More specifically, rollers 82 and 83 are mounted on pins 101, 102 to allow free rotation. Each roller preferably includes a non-abrasive resilient portion 84 such as a foam rubber cover or jacket. Each channel 80 and 85 is preferably sufficiently larger than the thickness of roof inserts 35, 37 to prevent direct contact between the inserts and the walls of the storage body 22 which define channels 80, 85 to prevent marring of the roof inserts. In order to guide roof inserts 35, 37 into channels 80, 85 and to support roof inserts 35, 37 in storage body 22, a portion of each roller 82, 83 extends into channel 80. Roller pair 91 functions in the same manner. Storage body 44 is similarly equipped with opposed rollers in association with each channel.

It will be appreciated that closed ends 100 and 105 not only provide support to roof insert 35 during storage, but also act as a position locator for roof insert 35 with respect to pin receiving bores 110 and 115. Accordingly, body portion 75 of each storage body, illustrated here in connection with storage body 22, has two post or pin receiving bores 110 and 115 defined by cone-shaped portions 111 and 116 of storage body 35. As an optional feature, each pin-receiving bore may fitted with metal grommets (not shown) which can be secured by an allen screw or the like.

The embodiment of storage body 20 shown in FIGS. 1-5 has a generally rectangular face 132 and a narrower rectangular lip 134 which accommodates the recess defining channels 80 and 85. Numerous other geometries are suitable and may be required to fit a particular vehicle compartment configuration such as that shown in FIG. 6, which will be explained more fully herein.

The compact nature of storage bodies 22 and 44 maximizes space utilization and helps to minimize weight. In this regard, and referring now to FIGS. 1 and 2 of the drawings, it is seen that storage body 22 fits snugly into well 25. Each slot or channel 80 and 85 is preferably laterally displaced several degrees off the vertical axis of face 132 of storage body 22. It should also be noted that channels 80 and 85 are preferably curved or arcuate to match the curvature of roof insert 35. By configuring the channels and storage body 22 in this manner, roof insert 35, when installed in the storage device 20 as shown in FIG. 4, is angled toward the front of the motor vehicle. This feature allows additional clearance such that the hatchback lid 139 of motor vehicle 30 can be closed.

Referring again to FIGS. 1 through 3, in operation, roof insert 35 is removed from its position in the roof of motor vehicle 30. The roof insert is carried to the rear of the motor vehicle where roof insert storage assembly 20 is located in well 25. Roof insert 35 is then inserted into channel 85 of storage body 22 and channel 87 of matching storage body 44. The bottom edge of panel portion 45 rests on and is protected against abrasion by resilient strips of material such as foam rubber bumpers 103 and 106 in a portion of channel 80 or the like which are shown in FIG. 3 only. These bumpers may be attached by means of any suitable adhesive as will be appreciated by those skilled in the art.

This procedure is then repeated with the second motor vehicle roof insert which is inserted into channels in the same manner as roof insert 35. Thus, it will be appreciated that in one aspect a method of storing motor vehicle roof inserts is provided herein.

In still another aspect, the present invention provides a roof insert storage device which includes means for securing the roof inserts in position in the storage device. In this regard, and referring again to FIG. 4 of the drawings, as will be appreciated by those skilled in this art, in general, motor vehicle roof inserts are equipped with a post and lock assembly 40. In this configuration, posts or pins, one of which is shown as post or pin 150, may be retracted a predetermined distance within the housing 160 by means of lever 165. In the extended position, pin 150 may be locked by way of key lock 170. In this embodiment of the invention, as roof insert 35 is placed in storage apparatus 20, channel ends 100 and 105 (or bumpers 103 and 106 where present) are positioned relative to post-receiving bores 110 and 115 such that the roof insert pins are automatically in alignment. Once in position, lever 165 is actuated to extend pin 150 into pin-receiving bores 115. In this manner, roof insert 35 is secured in position so that it cannot move during a sudden stop or the like. By actuating the lock mechanism with key lock 170, the pins can be locked into position to deter theft of the inserts. Cones 111 and 116 may each include a funnel-shaped opening into bores 110 and 115 to assist in positioning, i.e. to guide the pins into the bore.

Thus, it is apparent that there has been provided in accordance with the invention a method and apparatus that fully satisfies the objects, aims and advantages set forth above. While the invention has been described in connection with specific embodiments thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

Figure 6:
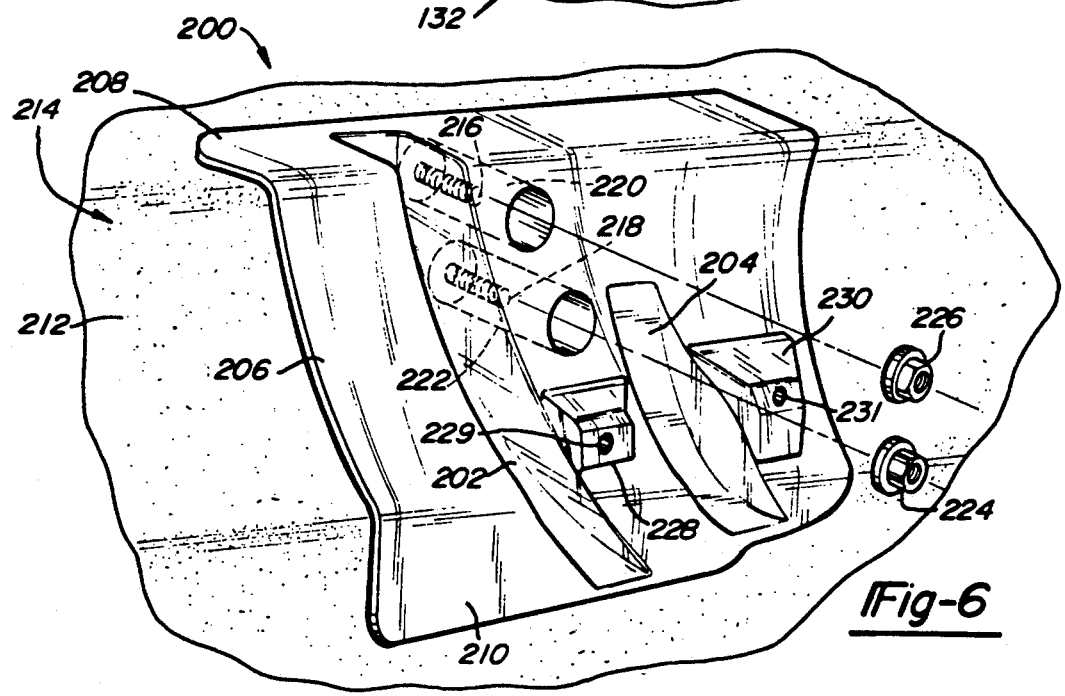
FIG. 6 is a perspective view of another storage body made in accordance with the present invention.

FIG. 6 reflects a modification of the structure shown in FIG. 1-5 to accommodate a well area of a different configuration. Accordingly, storage body 200 is shown having a first full channel 202 and a second generally parallel partial channel 204. Body 200 includes a sloping portion 206 between lip 208 and bottom portion 210 to mate more closely with wall 212 of well 214. Storage body 200 mounts in the same manner as that shown in FIGS. 1-5, i.e. by way of studs 216, 218 on a plate (not shown) mounted on wall 212. Studs 216 and 218 project through bores in the ends of recessed cylinders 220, 222 shown in phantom. Nuts 224 and 226, of course, are secured onto studs 216, 218. As also provided in the storage body shown in FIGS. 1-5, pin-bore defining structures 228 and 230 define bores 229, 231 for receiving roof insert locking pins. Unlike the previously described structures, however, the embodiment shown in FIG. 6 includes, as stated, one full channel 202 beginning at horizontal lip 208 and extending to near the bottom of storage body 200 in the manner of channel 204. It is preferred that the length of this second channel be 75 percent or less than that of channel 202. The other storage body of the "set" has channels corresponding to channels 202 and 204 reversed. In other words, the matching storage body is configured such that channels 202 and 204 are in reverse order. With this arrangement, one lateral edge of a roof insert slides into a partial channel and the other lateral edge slides into a full channel. The two inserts are therefore staggered somewhat to conform to the lid configuration of some vehicles.

Figure 7:
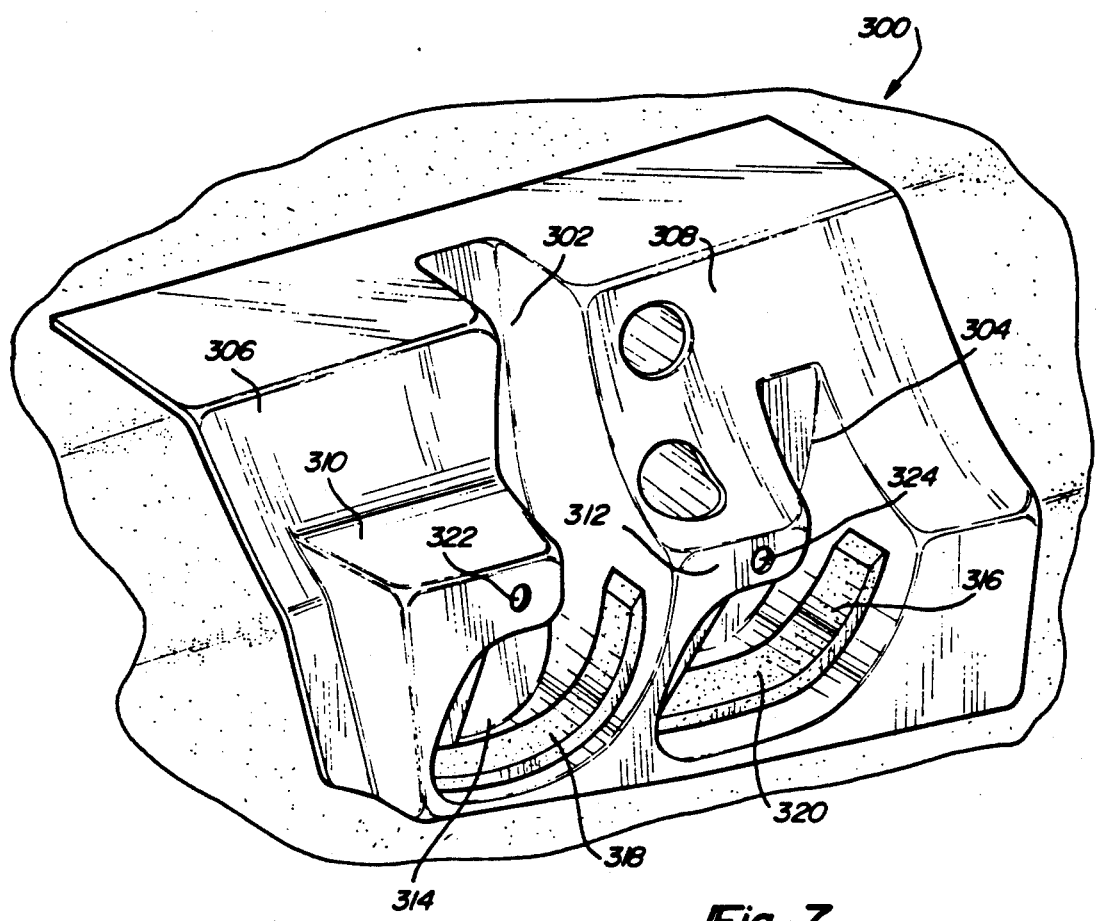
FIG. 7 is a perspective view of yet another storage body made in accordance with the present invention.

In still another embodiment as shown in FIG. 7, storage body 300 is shown having a first full channel 302 and a second generally parallel partial channel 304. Body 300 includes sloping portions 306 and 308. Unlike the device depicted in FIG. 6, however, sloping portions 306 and 308 terminate at horizontal planar portion 310 and face 312, respectively. In this embodiment, the lower ends 314 and 316 of each channel 302 and 304 are expanded to form generally L-shaped channels 302 and 304. In this manner t-top inserts having bulky weather stripping are better accomodated in channels 302 and 304. Pads 318 and 320 serve to cushion vibrations and prevent scratches due to sliding frictional contact between body 300 and the t-top inserts. Bores 322 and 324 again receive the t-top locking pins. Storage body 300 is mounted within a vehicle in the same manner as described above.

What is claimed is:

1. A storage device for vehicle roof inserts, comprising:
 a pair of matched storage bodies, each storage body having two channels extending in parallel curved paths for receiving a pair of vehicle roof inserts; and
 four pairs of opposed rollers, one pair of said rollers being mounted to the storage bodies in association with each of said channels, said rollers rotating about axes which are generally perpendicular to said paths of the channels, said rollers being received in said channels to contact and guide the vehicle roof inserts into said channels.

2. The invention recited in claim 1, wherein each of said storage bodies have means for attaching said storage bodies to a motor vehicle.

3. The invention recited in claim 1, wherein each of said storage bodies includes two pin-receiving bores for receiving roof insert-locking pins.

4. The invention recited in claim 1, wherein at least a portion of each said channels is lined with a material which is less abrasive than the material used to form the inserts which are to be received within said channels.

5. A storage system which is mounted in a motor vehicle for receiving and securing vehicle roof inserts, said storage system comprising:
   a vehicle body having a trunk;
   a first storage body mounted in said trunk which includes a first body portion having first and second channels, said first channel being adapted to receive a first edge portion of a first motor vehicle roof insert and said second channel being adapted to a receive a first edge portion of a second motor vehicle roof inserts;
   a first pair of opposed rollers mounted on said first storage body, one of said rollers of said first pair being disposed at one side of said first channel of said first storage body and the other of said rollers of said first pair being disposed at the other side of said first channel of said first storage body, at least a portion of each of said rollers of said first pair extending into said first channel of said first storage body;
   a second pair of opposed rollers mounted on said first storage body, one of said rollers of said second pair being disposed at one side of said second channel of said first storage body and the other of said rollers of said second pair being disposed at the other side of said second channel of said first storage body, at least a portion of each of said rollers of said second pair extending into said second channel of said first storage body;
   a second storage body mounted on said trunk of the vehicle which includes a second body portion having first and second channels, said first channel of said second body portion being adapted to receive a second edge portion of said first motor vehicle roof insert and said second channel being adapted to receive a second edge portion of said second motor vehicle roof insert;
   a third pair of opposed rollers mounted on said second storage body, one of said rollers of said third pair being disposed at one side of said first channel of said second storage body and the other of said rollers of said third pair being disposed at the other side of said first channel of said second storage body, at least a portion of each of said rollers of said third pair extending into said first channel of said first storage body;
   a fourth pair of opposed rollers mounted on said second storage body, one of said rollers of said fourth pair being disposed at one side of said second channel of said second storage body and the other of said rollers of said fourth pair being disposed at the other side of said second channel of said second storage body, at least a portion of each of said rollers of said fourth pair extending into said second channel of said second storage body; and
   means for releasably securing said first and second motor vehicle roof inserts in said first and second channels of said first body portion and said first and second channels of said second body portion, and a trunk lid for selectively enclosing said trunk, said channels being positioned such that said trunk lid can be closed while said first and second motor vehicle roof inserts are received within said storage bodies, said securing means includes two roof insert lock pin-receiving bores in association with said first body portion and two roof insert lock pin-receiving bores in association with said second body portion.

6. The invention recited in claim 5, wherein said storage system further includes means for mounting said first and second storage bodies in a motor vehicle.

7. The invention recited in claim 5, wherein said storage system further includes a plurality of liners in association with said body portions at said channels said liners being less abrasive than the material used to form the inserts.

8. The invention recited in claim 5, wherein each of said channels has an open end and a closed end.

9. The invention recited in claim 5, wherein at least a portion of said rollers is resilient.

10. A storage device for receiving a pair of arcuate motor vehicle roof inserts, each of said roof inserts having a pair of retractable locking pins, said storage device comprising:
    a matched pair of body portions, each of said body portions having two generally parallel channels, each of said channels being contoured to receive and mate the curvature of said arcuate motor vehicle roof inserts,
    one end of each of said channels being closed on its respective body portion, the other end of each of said channels being open to slidably receive an edge portion of one of said roof inserts;
    means in association with each channel for guiding and supporting said roof inserts in said channels;
    means in association with each of said body portions for attaching said body portions to a receiving surface of a motor vehicle; and
    means in association with each of said body portions for receiving said locking pins.

11. The invention recited in claim 10, wherein said channels are lined with non-abrasive material.

12. The invention recited in claim 10, wherein said body portions are formed of plastic.

13. The invention recited in claim 12, wherein said body portions are formed of ABS plastic.

14. A method of storing first and second motor vehicle roof inserts, said first roof insert having a pair of retractable pins positioned at opposite ends of said first roof insert and said second roof insert having a pair of retractable pins positioned at opposite edges of said second roof insert, said method comprising the following steps:
    retracting said pins of said first roof insert from said motor vehicle roof;
    inserting said first roof insert in a first set of complementary channels of a matched pair of roof insert storage structures, said roof insert storage structures each having a bore for receiving said pins of said first roof insert, said roof insert storage structures being mounted in said motor vehicle;
    extending said retracted pins such that a portion of said pins extend into said bores to secure said first roof insert into position in said storage structures;
    retracting said pins of said second roof insert and removing said roof insert from said motor vehicle roof;

inserting said second roof insert in a second set of complementary channels of said matched pair of roof insert storage structures; and extending said retracted pins such that a portion of said pins extend into said bores to secure said second roof insert into position in the storage structures.

15. The invention recited in claim 14, wherein said roof insert storage structures are formed of plastic.

16. The invention recited in claim 15, wherein said roof insert storage structures are formed by injection molding.

17. The invention recited in claim 14, wherein said roof insert storage structures include a non-abrasive lining in said channels.

18. A motor vehicle having a storage system for receiving and securing vehicle roof inserts, said motor vehicle comprising:

a motor vehicle having a body with a trunk well area;

mounted in said well area, a first storage body which includes a first body portion having first and second channels, said first channel being adapted to receive a first edge portion of a first motor vehicle roof insert and said second channel being adapted to receive a first edge portion of a second motor vehicle roof insert;

mounted in said well area, a second storage body which includes a second body portion having first and second channels, said first channel of said second body portion being adapted to receive a second edge portion of said first motor vehicle roof insert and said second channel being adapted to receive a second portion of said second motor vehicle roof insert;

means for releasably securing said first and second motor vehicle roof inserts in said first and second channels of said first body portion and said first and second channels of said second body portion; and said securing means includes two roof insert lock pin-receiving bores in association with said first body portion and two roof insert lock pin-receiving bores in association with said second body portion.

19. The invention recited in claim 18, wherein said storage system further includes means for mounting said first and second storage bodies in said motor vehicle.

* * * * *